(12) United States Patent
Lantto et al.

(10) Patent No.: US 8,304,948 B2
(45) Date of Patent: Nov. 6, 2012

(54) ROTOR STRUCTURE FOR A PERMANENT MAGNET ELECTRICAL MACHINE

(75) Inventors: Erkki Lantto, Helsinki (FI); Marko Palko, Espoo (FI); Ville Tommila, Helsinki (FI)

(73) Assignee: Sulzer Pump Solutions AB, Malmö (SE)

( * ) Notice: Subject to any disclaimer, the term of this patent is extended or adjusted under 35 U.S.C. 154(b) by 107 days.

(21) Appl. No.: 12/682,381

(22) PCT Filed: Jul. 31, 2008

(86) PCT No.: PCT/FI2008/050447
§ 371 (c)(1),
(2), (4) Date: Aug. 18, 2010

(87) PCT Pub. No.: WO2009/047384
PCT Pub. Date: Apr. 16, 2009

(65) Prior Publication Data
US 2010/0301696 A1    Dec. 2, 2010

(30) Foreign Application Priority Data
Oct. 9, 2007   (FI) .................................. 20070761

(51) Int. Cl.
*H02K 21/12* (2006.01)
(52) U.S. Cl. ......... 310/156.28; 310/156.11; 310/156.19; 310/156.22
(58) Field of Classification Search ............. 310/156.04, 310/156.14, 216.08, 216.21–23, 216.27–29, 310/216.31–32, 156.08, 156.21–23, 156.27–29, 310/156.31–32, 156.01, 156.24, 156.48, 310/156.72, 156.76
See application file for complete search history.

(56) References Cited

U.S. PATENT DOCUMENTS

| | | | |
|---|---|---|---|
| 4,625,135 A | 11/1986 | Kasabian | |
| 5,801,470 A | 9/1998 | Johnson et al. | |
| 6,047,461 A * | 4/2000 | Miura et al. | 29/598 |
| 6,097,125 A * | 8/2000 | Park et al. | 310/12.24 |
| 6,661,145 B1 | 12/2003 | Nilson | |
| 2005/0099079 A1 | 5/2005 | McMullen et al. | |

(Continued)

FOREIGN PATENT DOCUMENTS
JP          7163072 A        6/1995
(Continued)

OTHER PUBLICATIONS

Machine Translations of JP09224339 (1997), JP08126234 (1996), and JP2000161280 (2000).*

(Continued)

*Primary Examiner* — Quyen Leung
*Assistant Examiner* — Jose Gonzalez Quinones
(74) *Attorney, Agent, or Firm* — Venable LLP; Eric J. Franklin

(57) ABSTRACT

A rotor structure of a permanent magnet electrical machine and a method for manufacture of the rotor structure. The rotor structure has a shaft. An outer surface of the shaft is provided with a permanent magnet. A support collar encircles the permanent magnet. A protective piece is located between the outer surface of the shaft and an inner surface of the support collar and is arranged as an axial mechanical extension for the permanent magnet. The protective piece reduces local maximum values of forces forming between the support collar and the permanent magnet during rotation of the rotor.

11 Claims, 7 Drawing Sheets

U.S. PATENT DOCUMENTS

2005/0235481 A1* 10/2005 Ku et al. .................. 29/596
2006/0091752 A1    5/2006 Adaniya et al.

FOREIGN PATENT DOCUMENTS

| JP | 08126234 A | * | 5/1996 |
| JP | 9224339 A | | 8/1997 |
| JP | 09224339 A | * | 8/1997 |
| JP | 2000161280 A | * | 6/2000 |
| WO | WO-02078154 A1 | | 10/2002 |

OTHER PUBLICATIONS

Search Report Issued by Finnish Patent Office in Priority Application—Feb. 27, 2008.
PCT/ISA/210—International Search Report—Nov. 19, 2008.
PCT/ISA/237—Written Opinion of the International Search Authority—Nov. 19, 2008.
PCT/IPEA/409—International Preliminary Report on Patentability—Jan. 11, 2010.

* cited by examiner

ROTOR STRUCTURE FOR A PERMANENT MAGNET ELECTRICAL MACHINE

CROSS-REFERENCE TO RELATED APPLICATIONS

This application claims priority to Finnish patent application 20070761 filed 9 Oct. 2007 and is the national phase under 35 U.S.C. §371 of PCT/FI2008/050447 filed 31 Jul. 2008.

TECHNICAL FIELD

The invention relates to a rotor structure for a permanent magnet electrical machine, which can operate as an electric motor or electric generator. The invention also relates to a method for the manufacture of a rotor for a permanent magnet electrical machine. The invention further relates to a permanent magnet electrical machine.

BACKGROUND OF THE INVENTION

Materials for permanent magnets, such as neodymium iron barium (NeFeB) or samarium cobolt (SmCo), with which strong magnetic flux density 1 . . . 1.2T can be achieved, are typically very brittle. Especially the ability of the permanent magnet materials to withstand tensile stress is poor. Thus, permanent magnets in the rotor of a permanent magnet electrical machine usually have to be strengthened with support structures made of more viscous material. The said strengthening is very important especially in permanently magnetised high-speed electric machines, in which the peripheral speed of the outer surface of the rotor can be even hundreds of meters in a second.

FIG. 1a illustrates the state-of-the-art rotor structure for a permanent magnet electrical machine, seen from the side. FIG. 1b illustrates the cross section A-A of the said rotor structure. The rotor structure has a shaft 101 with permanent magnets 102-113 on its outer surface. The shaft is preferably made of ferromagnetic steel. The outer surface of the shaft 101 is provided with a sleeve 115 made of magnetically non-conductive material, with through-holes for the permanent magnets 102-113. The arrows drawn to the permanent magnets 102-113 describe the magnetising direction of each permanent magnet. A support collar 114 has been arranged onto the sleeve 115 and the permanent magnets 102-113. The support collar 114 is shown in longitudinal section in FIG. 1a. The sleeve 115 can be attached to the shaft 101 by, for example, screws 116 and/or a crimped joint based on thermal expansion phenomenon, i.e. thermal crimping. The sleeve 115 can be made, for example, of plastic, aluminium, titanium or some other suitable magnetically non-conductive material. In this document, material, which is not ferromagnetic, is called magnetically non-conductive material. In the rotor structure shown in FIGS. 1a and 1b, each permanent magnet 102-113 is assembled of several axially consecutive pieces. In this document, axial refers to the direction of the rotor's rotation axis 160. FIG. 1c illustrates a longitudinal section of area B shown in FIG. 1a. The longitudinal section plane is the x,y plane marked to FIGS. 1a and 1c. FIG. 1c corresponds to an exemplary situation, in which the rotor structure rotates around the rotation axis 160. Permanent magnets are influenced by centrifugal force, which causes the permanent magnets to be pressed against the support collar 114. In other words, the support collar 114 directs radial forces to the permanent magnets, the forces keeping the permanent magnets on the circular orbit. Forces between the permanent magnets and the support collar stretch the support collar. In FIG. 1c, the stretching of the support collar has been strongly exaggerated in order to demonstrate the phenomenon. FIG. 1c shows how the permanent magnet 106 is pressed against the support collar 114. A strong surface pressure is applied to the area of the permanent magnet 106 illustrated by the arrow 130. The said strong surface pressure stresses the brittle permanent magnet material 106 and may even cause fractures. An adversely high surface pressure may also be directed to the support collar 114. The situation can be somewhat improved by rounding the edge of the permanent magnet 106 indicated by the arrow 130 and/or by selecting the length of the support collar so that the ends of the support collar and permanent magnets are aligned with each other as closely as possible in the axial direction. The realisation of these matters is complicated by the hard machineability of the permanent magnets and the possible moving of the support collar in relation to the permanent magnets.

One state-of-the-art solution is to attach the permanent magnets 102-113 to the shaft 101 so that the pressing of the permanent magnets against the support collar 114 would be lighter. The said attachment is generally done by gluing. However, in high-speed electric machines this solution is generally not feasible, because achieving a sufficiently strong attachment between the brittle permanent magnets 102-113 and the shaft 101 is a very challenging task. On the other hand, if the attachment between the permanent magnets and the shaft were able to endure the stress caused by the centrifugal force, i.e. the said attachment could keep the permanent magnets on the circular orbit, internal tensile stresses would be generated to the permanent magnets. This would not be advantageous, because the ability of several permanent magnet materials to tolerate tensile stress is poor.

SUMMARY OF THE INVENTION

The invention relates to the rotor structure of a permanent magnet electrical machine, which can operate as an electric motor or electric generator. The rotor structure of a permanent magnet electrical machine according to the invention has:
  a shaft;
  a permanent magnet;
  a support collar, which encircles the said shaft and the said permanent magnet; and
  a protective piece, which is located between the outer surface of the said shaft and the inner surface of the said support collar and which has been arranged as an axial mechanical extension for the said permanent magnet, and whose mass midpoint is located at a distance from the geometrical rotation axis of the rotor structure.

The invention also relates to a method for the manufacture of a permanent magnet electrical machine. In the method of the invention:
  a protective piece is installed so that the said protective piece will form an axial mechanical extension for the permanent magnet in the said rotor and that the mass midpoint of the said protective piece will stay at a distance from the geometrical rotation axis of the rotor; and
  a support collar is installed to encircle the said rotor shaft, the said permanent magnet and the said protective piece so that the said protective piece will remain between the outer surface of the said shaft and the inner surface of the said support collar.

The invention further relates to a permanent magnet electrical machine, which can operate as an electric motor or electric generator. The permanent magnet electrical machine of the invention contains a rotor, which has a shaft fitted to the frame of the said electric machine with bearings;

a permanent magnet;

a support collar, which encircles the said shaft and the said permanent magnet; and a protective piece, which is located between the outer surface of the said shaft and the inner surface of the said support collar and which has been arranged as an axial mechanical extension for the said permanent magnet, and whose mass midpoint is located at a distance from the geometrical rotation axis of the rotor structure.

The considerable advantage achievable with the invention is that by means of the said protective piece it is possible to reduce the local maximum values of the forces formed between the support collar and the permanent magnet as the rotor rotates without having to shape the permanent magnet or to strive for a structure, in which the ends of the support collar and the permanent magnet are matched as closely as possible in the axial direction.

SHORT DESCRIPTION OF THE FIGURES

Embodiments of the invention and their benefits will be explained next in more detail, referring as examples to the shown embodiments and the enclosed drawings, in which FIGS. 1a, 1b and 1c are side views of the rotor structure of a permanent magnet electrical machine according to the state of the art, the cross-section of the said rotor structure, and a detail of the said rotor structure;

DETAILED DESCRIPTION OF THE EMBODIMENTS OF THE INVENTION

Figure 1A:
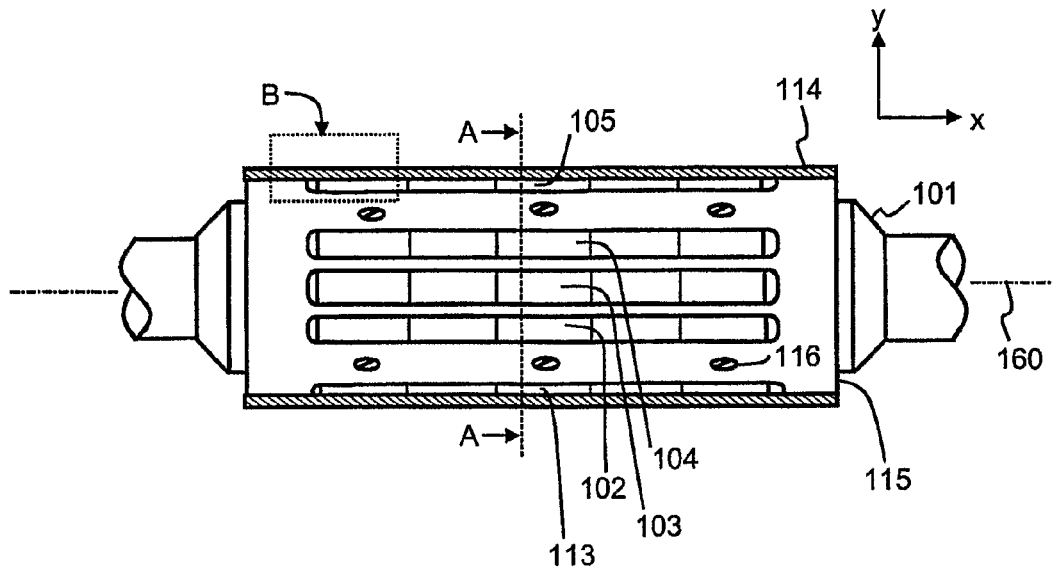
Figure 1B:
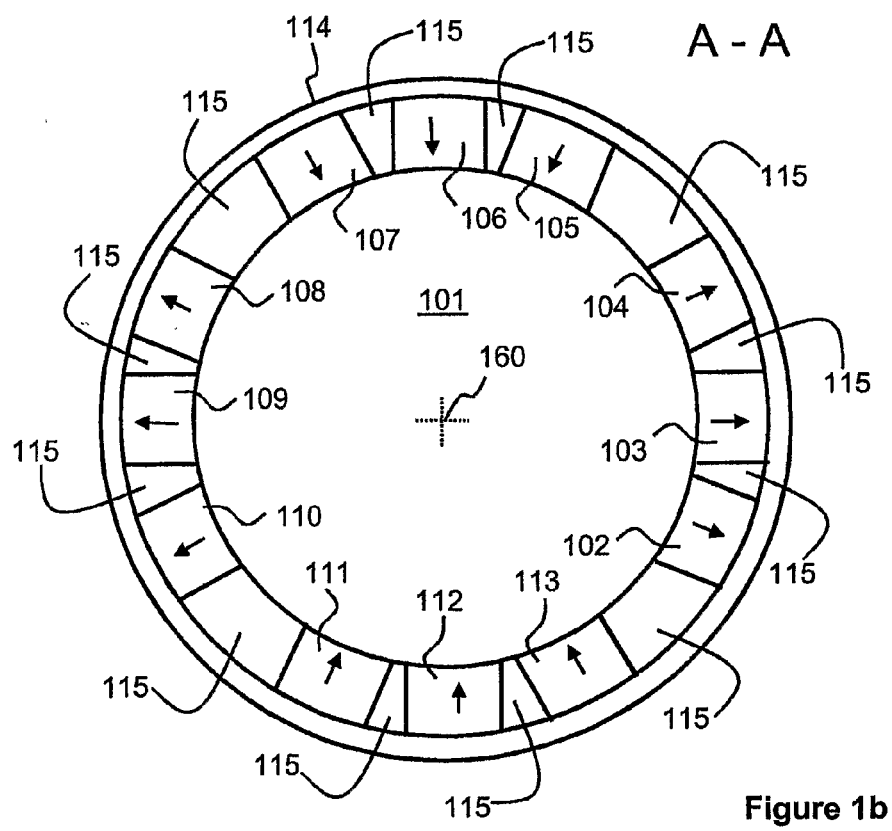
Figure 1C:
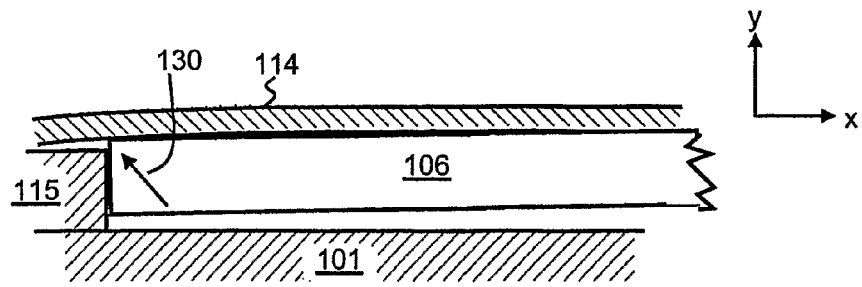

FIGS. 1a, 1b and 1c have been explained earlier in this document in connection of the description of the state-of-the-art technology.

Figure 2A:
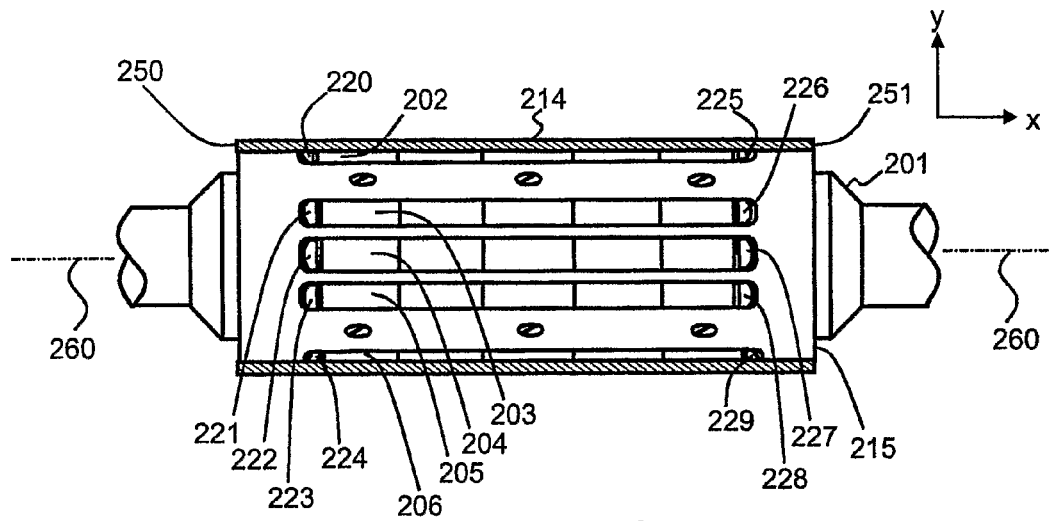
FIGS. 2a and 2b illustrate an embodiment of the rotor structure of a permanent magnet electrical machine seen from the side and a detail of the said rotor structure.
Figure 2B:
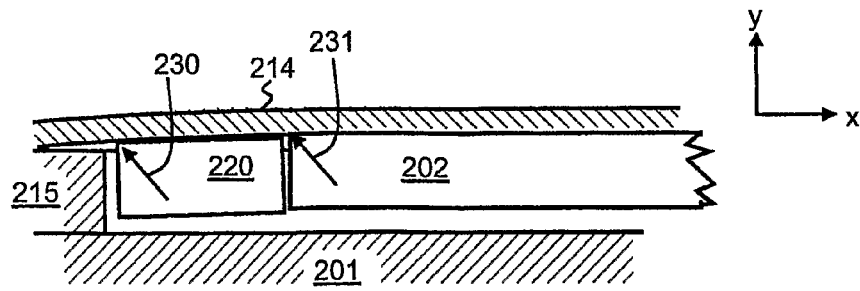

FIG. 2a illustrates the rotor structure of a permanent magnet electrical machine according to an embodiment of the invention, seen from the side. FIG. 2b is a longitudinal section of a detail of the said rotor structure. The rotor structure has the shaft 201, with permanent magnets 202-206 provided on its outer surface. The shaft is preferably made of ferromagnetic steel. On the outer surface of the shaft 201 there is the sleeve 215 made of magnetically non-conductive material, with through holes for the permanent magnets 202-206. The surface collar 214 is located on the sleeve 215 and the permanent magnets 202-206. In FIG. 2a, the support collar 214 is shown in longitudinal section. The sleeve 215 can be attached to the shaft 201, for example, by screws and/or a crimp joint based on thermal expansion phenomenon, i.e. thermal crimping. The sleeve 215 can be made, for example, of plastic, aluminium, titanium, or some other suitable magnetically non-conductive material. Next to the permanent magnets 202-206 there are protective pieces 220-229. The protective pieces are preferably located so that a protective piece operates as an axial mechanical extension for the permanent magnet. It is also possible to install protective pieces between axially consecutive permanent magnet pieces. In the structure illustrated in FIG. 2c, the protective pieces are located as axial mechanical extensions for the permanent magnets 202-206 towards the ends 250 and 251 of the support collar 214. Each permanent magnet 202-206 consists of five axially consecutive pieces.

FIG. 2b is a longitudinal section of the vicinity of the protective piece 220 shown in FIG. 2a. The longitudinal section plane is the x,y plane marked to FIGS. 2a and 2b. FIG. 2b corresponds to an exemplary situation, in which the rotor structure rotates around the rotation axis 260. The permanent magnets and protective pieces are influenced by centrifugal force, which causes the permanent magnets and protective pieces to be pressed against the support collar 214. In other words, the support collar 214 applies radial forces to the permanent magnets and protective pieces, the forces keeping the permanent magnets and protective pieces on the circular orbit. Forces between the permanent magnets and protective pieces as well as the support collar stretch the support collar. In FIG. 2b, the stretching of the support collar has been strongly exaggerated in order to demonstrate the phenomenon.

FIG. 2b shows how the protective piece 220 and the permanent magnet 202 are pressed against the support collar 214. Strong surface pressure is applied to the edge of the protective piece 220 indicated by the arrow 230, because the sleeve 215 around the shaft 201 does not apply as high a pressure to the inner surface of the support collar as the protective pieces and permanent magnets. The protective piece 220 reduces the surface pressure that the support collar 214 applies to the edge of the permanent magnet 202 indicated by the arrow 231. The density ($kg/m^3$) of the protective piece material is preferably within the area of 0.3 . . . 1.3 times the density of the permanent magnet material. The viscosity of the protective piece material is preferably higher than the viscosity of the permanent magnet material. The protective pieces can be made, for example, of aluminium, titanium, stainless steel, brass, bronze, or copper.

In the rotor structure according to an embodiment of the invention, the support collar 214 is made of carbon fibre, the fibres of which are substantially in the tangential direction. In this document, tangential direction refers to the direction of the trajectory of the rotary movement.

In the rotor structure according to an embodiment of the invention the support collar 214 is made of titanium.

The rotor structure illustrated in FIG. 2a has four poles, but it is obvious for one skilled in the art that the structural principle shown in FIG. 2a can also be applied to rotor structures, in which the number of poles is two or more than four.

Figure 3A:
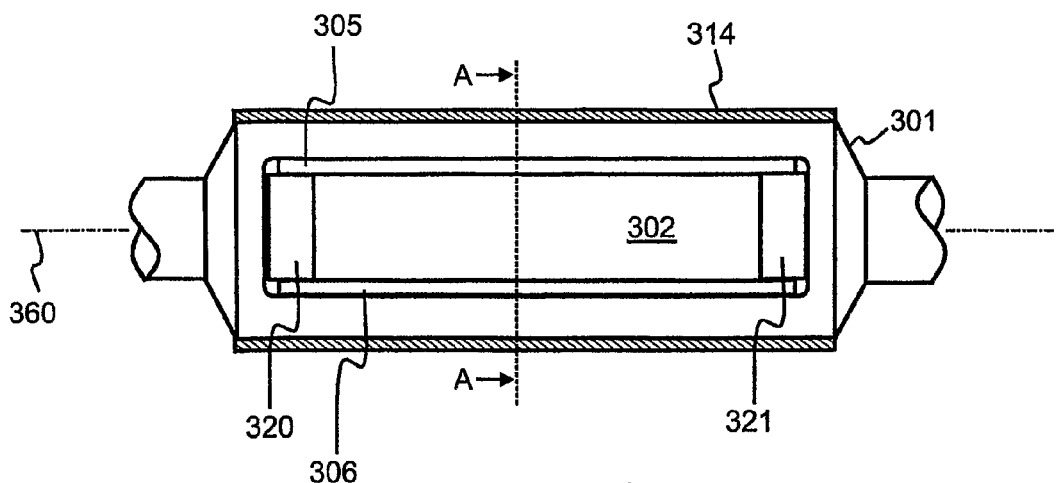
FIGS. 3a and 3b illustrate an embodiment of the rotor structure of a permanent magnet electrical machine seen from the side and a cross-section of the said rotor structure.
Figure 3B:
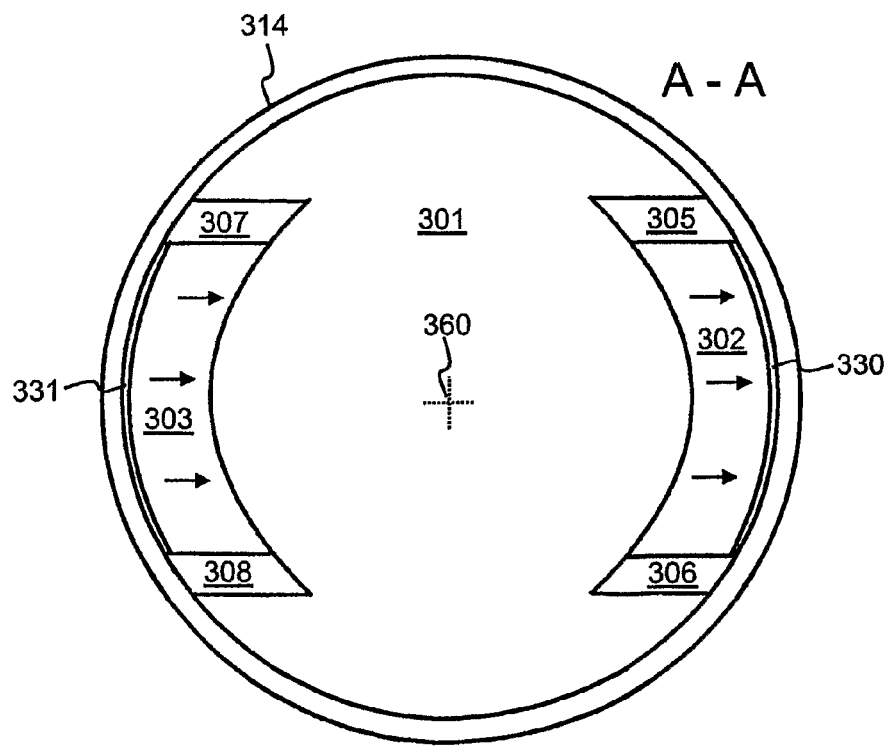

FIG. 3a illustrates the rotor structure of a permanent magnet electrical machine according to an embodiment of the invention, seen from the side. FIG. 3b illustrates the cross-section A-A of the rotor structure in question. The rotor structure has the shaft 301, with permanent magnets 302 and 303 provided on its outer surface. The shaft is preferably made of ferromagnetic steel. The arrows drawn to the permanent magnets 302 and 303 indicate the magnetisation direction of each permanent magnet. The permanent magnets 302 and 303 are located in recesses on the outer surface of the said shaft 301. There is a support collar 314 around the shaft 301 and the permanent magnets 302 and 303. In FIG. 3a, the support collar 314 has been shown in longitudinal section. The rotor structure has protective pieces, which are located between the outer surface of the said shaft and the inner surface of the said support collar and which are arranged as axial mechanical extensions for the permanent magnets. The protective pieces 320 and 321 are axial mechanical extensions for the permanent magnet 302.

In the rotor structure according to an embodiment of the invention, pieces 305, 306, 307 and 308 of magnetically non-conductive material are provided next to the surfaces of the permanent magnets 302 and 303 pointing to the tangential direction. The pieces 305, 306, 307 and 308 of magnetically non-conductive material can be, for example, plastic, aluminium, titanium, or some other suitable non-ferromagnetic material.

In the rotor structure according to an embodiment of the invention, each permanent magnet 302 and 303 has a radial play 330 and 331 between the support collar 314 and the shaft 301. In the situation depicted in FIG. 3b, the permanent magnets 302 and 303 can move on the plane of the picture surface 3b away from the rotation axis 360. In the situation depicted in FIG. 3b, the spaces 330 and 331 between the permanent magnets and the support collar 214 make possible the play of the permanent magnets 302 and 303. Depending on the position of the permanent magnets 302 and 303 in the said radial play, the spaces making possible the play can be either totally or partly also between the outer surface of the shaft 301 and the permanent magnets 302 and 303. As can be seen from FIG. 3b, the mutual fit of the permanent magnets 302 and 303 and the support collar 314 is not mechanically tight, so that the support collar can be pushed to place by using a movement in the direction of the rotation axis 332 without putting the support collar into contact with the permanent magnets of possibly brittle material during installation.

In the rotor structure according to an embodiment of the invention, the spaces 330 and 331 that enable the radial play of the permanent magnets 302 and 303 contain air. In the rotor structure according to another embodiment of the invention, the spaces 330 and 331 that enable the radial play of the permanent magnets 302 and 303 contain elastic material, which can be, for example, silicon.

The rotor structure illustrated in FIGS. 3a and 3b is bipolar, but it is obvious for one skilled in the art that the structural principle shown in FIGS. 3a and 3b can also be applied to rotor structures, in which the number of poles is more than two.

Figure 4:
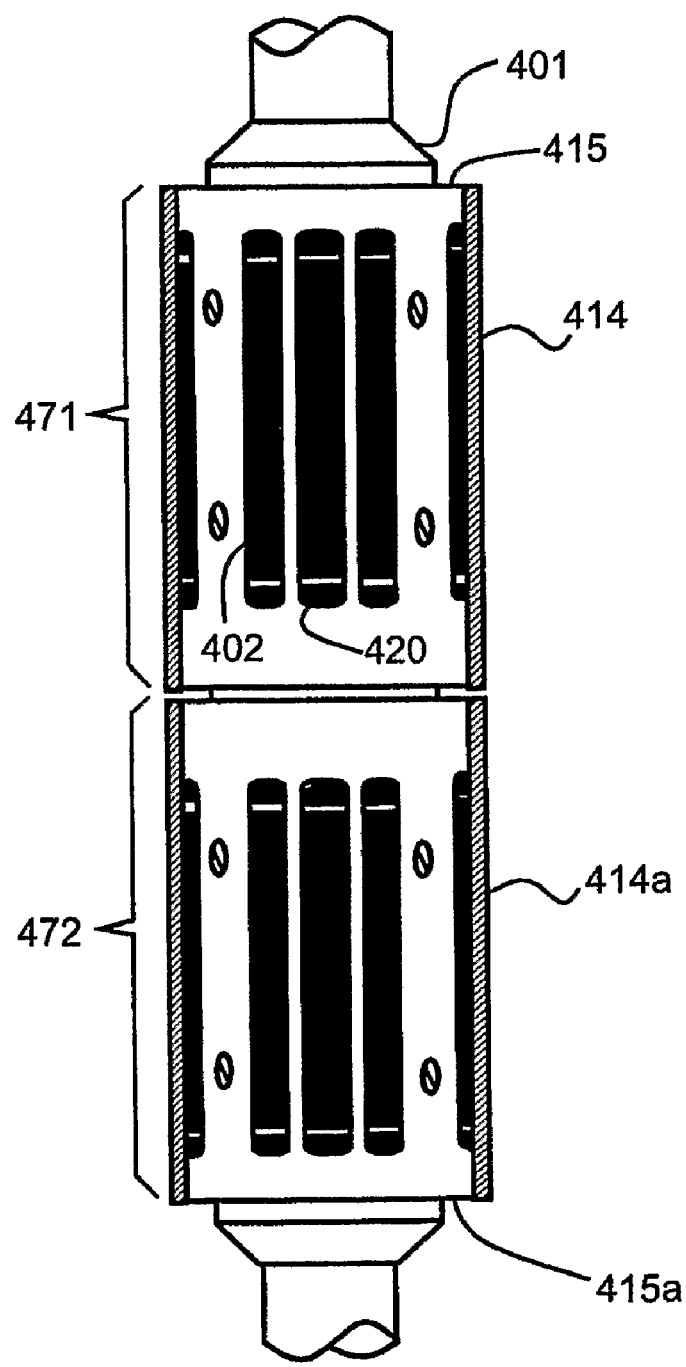
FIG. 4 is a side view of an embodiment of the rotor structure of a permanent magnet electrical machine.

FIG. 4 illustrates the rotor structure of a permanent magnet electrical machine according to an embodiment of the invention, seen from the side. The rotor structure has two axially successive sections 471 and 472, each contaning:
- permanent magnets (such as permanent magnet 402),
- a support collar encircling the shaft 401 and the said permanent magnets, and
- protective pieces (such as the protective piece 420) located between the outer surface of the said shaft and the inner surface of the said support collar, and arranged as axial mechanical extensions for the permanent magnets.

The structure illustrated in FIG. 4 is advantageous especially when the sleeves 415 and 415a and/or support collars 414 and 414a have different thermal expansion factor from the shaft 401. With the structure illustrated in FIG. 4 it is possible to reduce the axial mechanical stresses caused by temperature variations. In FIG. 4, the support collars 414 and 414a have been shown in longitudinal section, and the permanent magnets and protective pieces have been shown as black surfaces.

In the rotor structure of a permanent magnet electrical machine according to an embodiment of the invention there are more than two axially successive sections, each containing permanent magnets, a support collar, and protective pieces.

Figure 5:
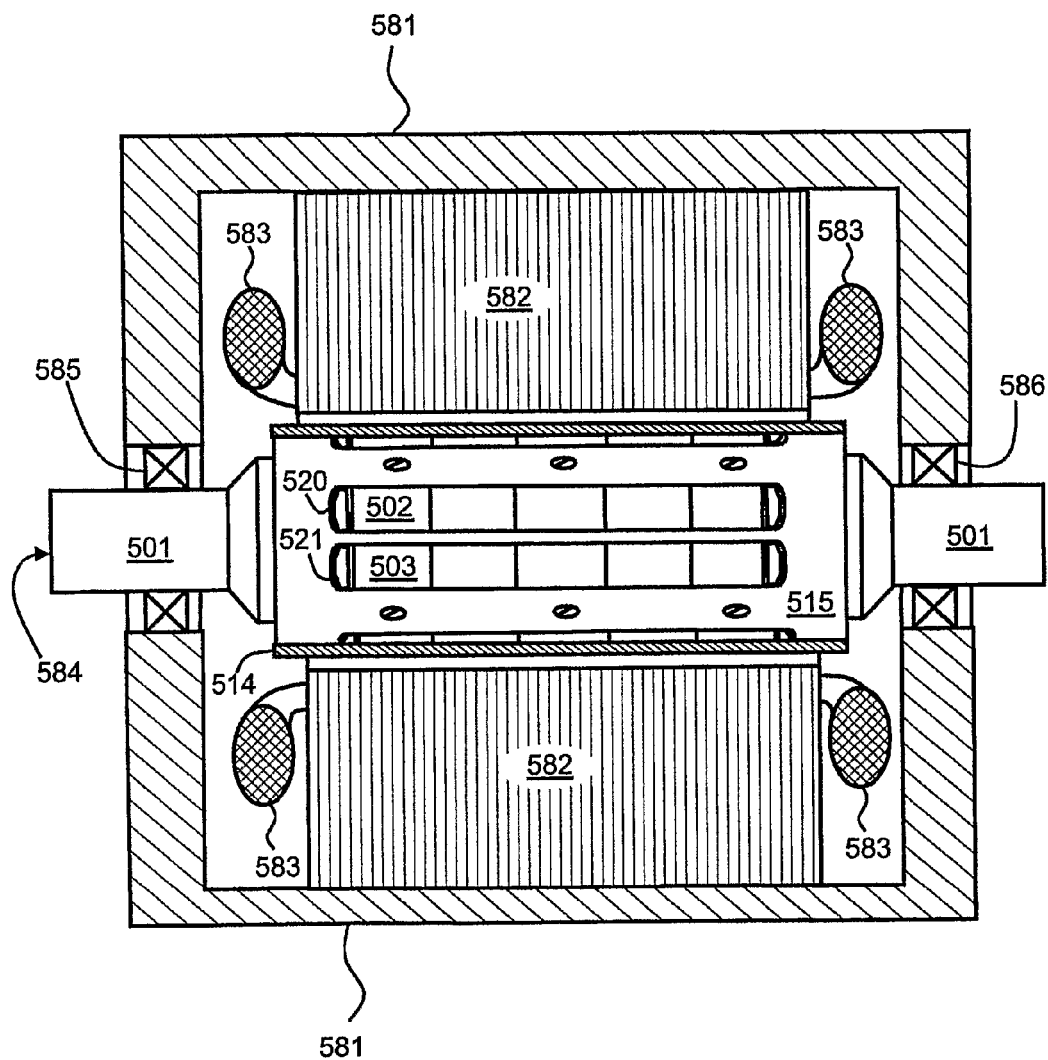
FIG. 5 illustrates a permanent magnet electrical machine according to an embodiment of the invention.

FIG. 5 illustrates a permanent magnet electrical machine according to an embodiment of the invention. The electric machine has the frame 581, to which the stator core 582 is attached. The grooves in the stator core have the stator winding 583. The rotor of the electric machine 584 has:
- a shaft 501, which is fitted to the frame 581 of the electric machine with bearings;
- permanent magnets (such as permanent magnets 502 and 503),
- a support collar 514, which encircles the said shaft and the said permanent magnets, and
- protective pieces (such as protective pieces 520 and 521), located between the outer surface of the said shaft and the inner surface of the said support collar, and arranged as axial mechanical extensions for the permanent magnets.

The support collar 514, frame 581, stator core 582, stator winding 583, and bearings 585 and 586 have been shown in longitudinal section in FIG. 5.

In the electric machine according to an embodiment of the invention, at least one of the bearings 585 and 586 is an active magnetic bearing.

In the electric machine according to an embodiment of the invention, both bearings 585 and 586 are active magnetic bearings.

In the electric machine according to an embodiment of the invention, at least one of the bearings 585 and 586 is a gas bearing.

In the electric machine according to an embodiment of the invention, at least one of the bearings 585 and 586 is a rolling bearing, which can, for example, be a ball or roller bearing.

In the electric machine according to an embodiment of the invention, at least one of the bearings 585 and 586 is a sliding bearing, which can be, for example, a rocker segment bearing.

Figure 6:
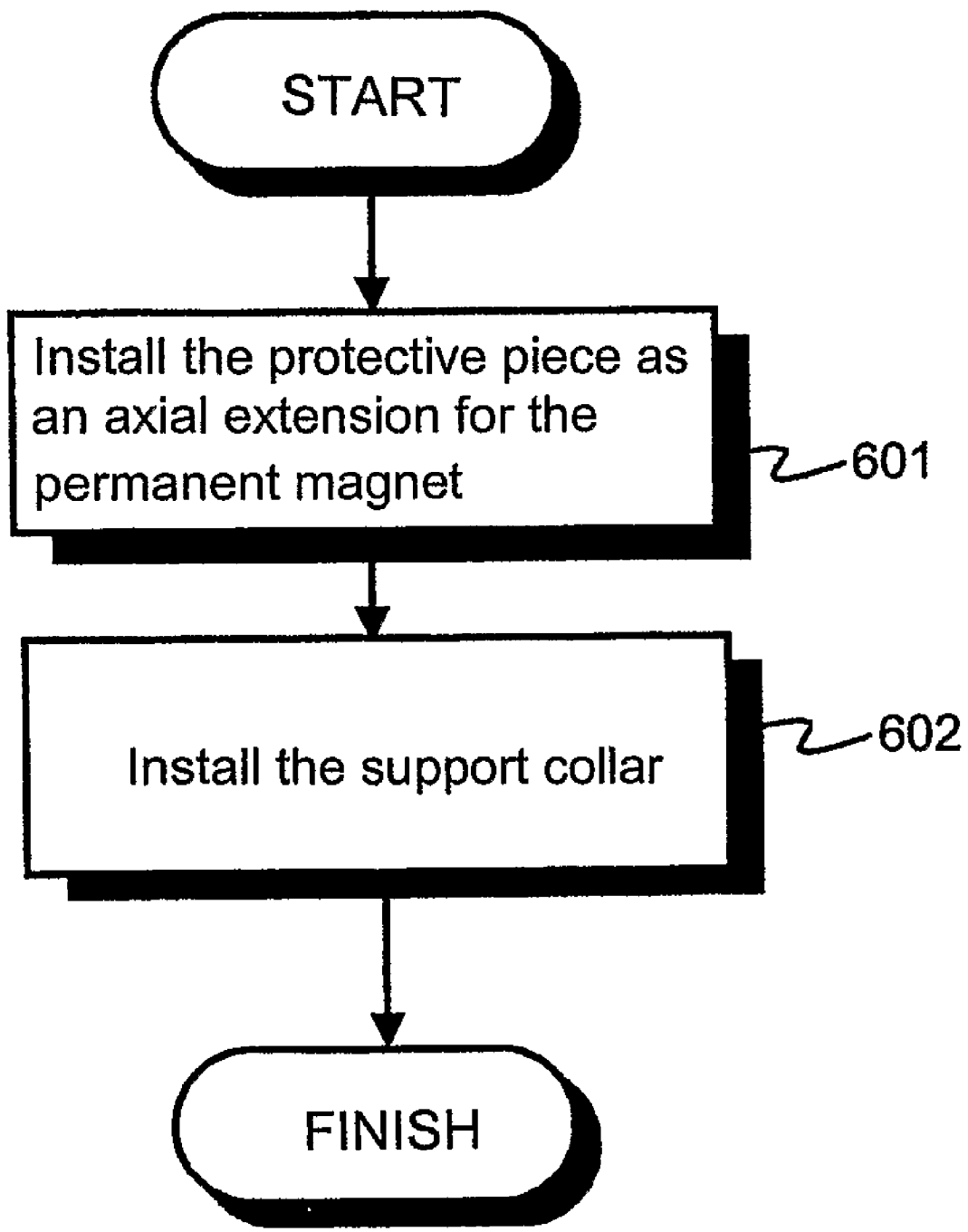
FIG. 6 is a flow chart of the method according to an embodiment of the invention for the manufacture of a permanent magnet electrical machine.

FIG. 6 is a flow chart of the method according to an embodiment of the invention for the manufacture of a rotor for a permanent magnet electrical machine. In step 601 a protective piece is installed so that the said protective piece will form an axial mechanical extension for the permanent magnet in the said rotor. In step 602 a support collar is installed to encircle the said rotor shaft, the said permanent magnet and the said protective piece so that the said protective piece stays between the outer surface of the said shaft and the inner surface of the said support collar. The support collar can be installed, for example, by pushing it with an axial movement to encircle the said shaft, the permanent magnet and the protective piece.

Figure 7A:
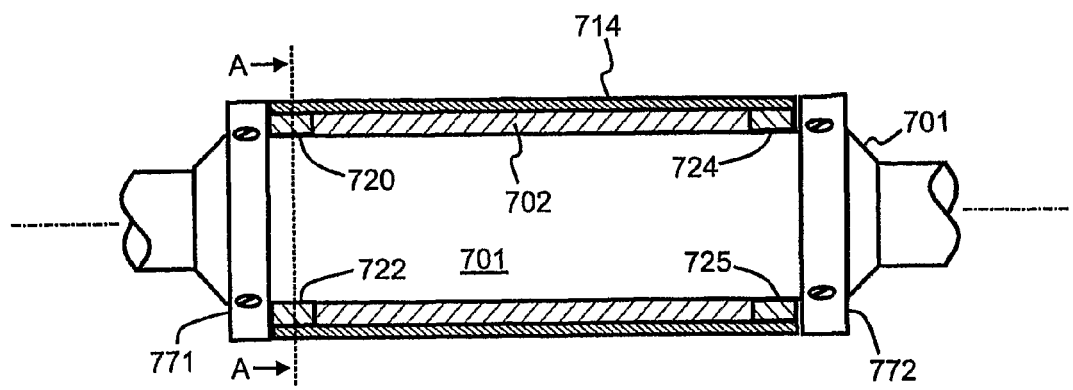
FIGS. 7a and 7b illustrate the rotor structure of a permanent magnet electrical machine according to an embodiment of the invention, seen from the side, and a cross-section of the said rotor structure.
Figure 7B:
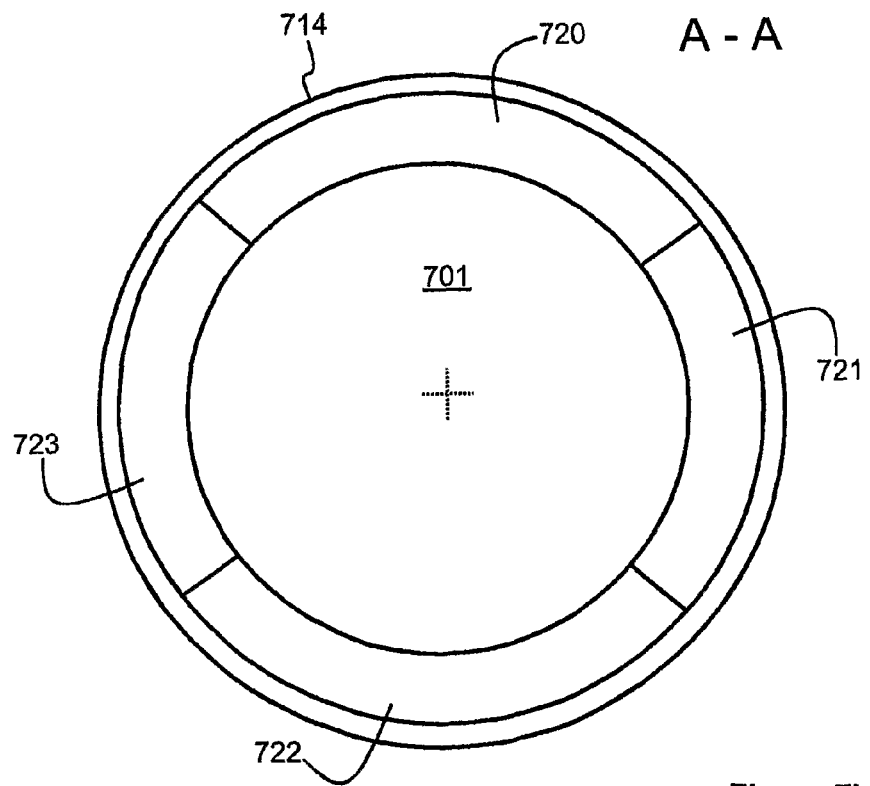

FIG. 7a illustrates the rotor structure of a permanent magnet electrical machine according to an embodiment of the invention, seen from the side. FIG. 7b is a cross-section A-A of the rotor structure in question. The rotor structure has the shaft 701, which is encircled by a tubular permanent magnet 702. The shaft is preferably made of ferromagnetic steel. The shaft 701 and the permanent magnet 702 is encircled by the support collar 714. The rotor structure has the protective pieces 720-725, which are located between the outer surface of the said shaft and the inner surface of the said support collar, and which are arranged as axial mechanical extensions for the permanent magnet. There are four protective pieces 720-723 shown in FIG. 7b. It is also possible to use one ring-shaped protective piece instead of the protective pieces 720-723. However, it is preferable that the ring-shaped protective piece is made of more elastic material than the permanent magnet 702. In FIG. 7a, the permanent magnet 702, support collar 714 and protective pieces 720, 722, 724 and 725 are shown in longitudinal section. The rotor structure has the support flanges 771 and 772, which are arranged to support the permanent magnet 702, support collar 714 and protective pieces 720-725 in the axial direction. The said support flanges 771 and 772 can be attached to the shaft 701, for example, by screws and/or by a crimping joint based on thermal expansion phenomenon, i.e. thermal crimping.

As is obvious for one skilled in the art, the invention and its embodiments are not restricted to the embodiment examples shown, but the invention and its embodiments can be varied within the independent patent claim. The expressions describing the existence of features contained in the claims, for example "the rotor structure has a shaft", are open so that the presentation of the features does not exclude the existence of such other features that have not been shown in the independent patent claims.

The invention claimed is:

1. A rotor structure of a permanent magnet electrical machine, the rotor structure comprising:
   a shaft,
   a permanent magnet,
   a support collar encircling the shaft and the permanent magnet, and
   a protective piece located between an outer surface of the shaft and an inner surface of the support collar and arranged as an axial mechanical extension for the permanent magnet,
   wherein a mass midpoint of the protective piece is located at a distance from a geometrical rotation axis a structure of the rotor, said protective piece extending in a tangential direction over less than half of an inner circumference of the support collar.

2. The rotor structure according to claim 1, wherein the permanent magnet is located in a recess on the outer surface of the said shaft.

3. The rotor structure according to claim 2, wherein a piece comprising magnetically non-conductive material is located next to a surface pointing to the tangential direction of the permanent magnet.

4. The rotor structure according to claim 1, further comprising:
   a sleeve arranged on the outer surface of the shaft, the sleeve comprising magnetically non-conductive material and comprising a through hole for the permanent magnet, and arranged to support the support collar in relation to the shaft.

5. The rotor structure according to claim 1, wherein the permanent magnet has a radial play between the support collar and the shaft.

6. The rotor structure according to claim 5, wherein the space making possible the play contains elastic material.

7. The rotor structure according to claim 1, wherein the rotor structure comprises at least two axially successive sections, each section comprising:
   a permanent magnet,
   a support collar encircling the shaft and the permanent magnet, and
   a protective piece located between the outer surface of the shaft and the inner surface of the support collar and arranged as an axial mechanical extension for the permanent magnet.

8. The rotor structure according to claim 1, wherein the support collar comprises carbon fiber, wherein fibers of the carbon fiber are substantially oriented in the tangential direction.

9. The rotor structure according to claim 1, wherein the support collar comprises titanium.

10. A permanent magnet electrical machine, comprising:
    a rotor, comprising
       a shaft fitted to a frame of the electrical machine with bearings,
       a permanent magnet,
       a support collar encircling the shaft and the permanent magnet, and
       a protective piece located between an outer surface of the shaft and the inner surface of the support collar and arranged as an axial mechanical extension for the permanent magnet,
       wherein a mass midpoint of the protective piece is located at a distance from a geometrical rotation axis of the rotor, said protective piece extending in a tangential direction over less than half of an inner circumference of the support collar.

11. A method for manufacture of a permanent magnet electrical machine, the method comprising:
    installing a protective piece so that the protective piece forms an axial mechanical extension for an permanent magnet in the rotor and wherein a mass midpoint of the protective piece remains at a distance from a geometrical rotation axis of the rotor, said protective piece extending in a tangential direction over less than half of an inner circumference of the support collar, and
    installing a support collar to encircle the rotor shaft, the permanent magnet and the protective piece so that the protective piece remains between an outer surface of the shaft and an inner surface of the support collar.

* * * * *